United States Patent
Dornfeld et al.

[15] 3,638,083
[45] Jan. 25, 1972

[54] FUSIBLE CERAMIC CAPACITOR

[72] Inventors: John E. Dornfeld, Mequon; Sidney B. Williams, Cedarburg, both of Wis.

[73] Assignee: Sprague Electric Company, North Adams, Mass.

[22] Filed: Aug. 14, 1970

[21] Appl. No.: 63,808

[52] U.S. Cl. .................. 317/247, 317/12 R, 337/404
[51] Int. Cl. ......................................... H01g 1/11
[58] Field of Search ............... 337/404, 405, 407; 317/247, 317/258, 256, 261, 12 R

[56] References Cited

UNITED STATES PATENTS

| | | | |
|---|---|---|---|
| 1,255,597 | 2/1918 | Giles | 317/256 X |
| 2,606,955 | 8/1952 | Herrick | 317/258 |
| 3,178,622 | 4/1965 | Paul et al. | 317/247 X |

FOREIGN PATENTS OR APPLICATIONS 232,904  6/1960  Australia .......................... 337/404

Primary Examiner—E. A. Goldberg
Attorney—Connolly and Hutz and Vincent H. Sweeney

[57] ABSTRACT

A fusible ceramic capacitor formed on a single dielectric substrate, having two capacitively coupled electrodes disposed on opposing surfaces thereof and further including a resilient lead wire fixedly attached to the ceramic substrate with one end bent into contact with one of the capacitor electrodes and connected thereto by means of a low melting point solder.

11 Claims, 4 Drawing Figures

FUSIBLE CERAMIC CAPACITOR

BACKGROUND OF THE INVENTION

The present invention relates to a fusible capacitor and more particularly to a thermally fused ceramic capacitor formed on a single substrate.

Ceramic capacitors are well known to the capacitor art and are considered to be among the most versatile of all, primarily because the dielectric can be made to give such a wide variety of results. It has been known in the art to incorporate fuses within individual capacitor elements, especially in the electrolytic capacitor field where the danger of overvoltage or a short circuit can result in a sudden increase in pressure eventually rupturing or exploding the capacitor case. Thermal sensitive fuses have not heretofore been incorporated in ceramic capacitors where the danger of leakage from a short circuit or an overvoltage is nonexistent. However, dielectric failure of a ceramic capacitor can cause damage to other components and particularly to the active components of the circuit.

Therefore it is an object of this invention to provide a ceramic capacitor incorporating a thermal fuse to protect against sudden overvoltage or surges of power.

It is a particular object of this invention to provide a simple thermally fused ceramic capacitor mounted on a single substrate.

SUMMARY OF THE INVENTION

A thermally fused ceramic capacitor formed in accordance with this invention generally involves a flat ceramic substrate having two substantially parallel surfaces with capacitively coupled electrodes disposed on each surface thereof. A resilient conductive lead wire is fixedly attached to the ceramic substrate so that the end of the wire is positioned above the electrodes, whereupon it is subsequently bent down into contact with one of the electrodes and connected thereto by means of a low melting point solder. Any subsequent surge of power as may be caused by dielectric failure or external circuit failure will result in heating of the low melting point solder thereby causing the resilient lead wire to spring away from the electrode and open circuit the capacitor.

More particularly the resilient lead wire is fixedly attached to the ceramic substrate by means of a metallized area disposed on the surface of the substrate and spaced apart from the capacitor electrode wherein a high melting point solder is utilized to bond the resilient lead wire to the metallized area. A second lead wire is also soldered to the opposing capacitor electrode with a high melting point solder thereby providing outside electrical connection to the capacitor.

DESCRIPTION OF THE PREFERRED EMBODIMENT

Figure 1:
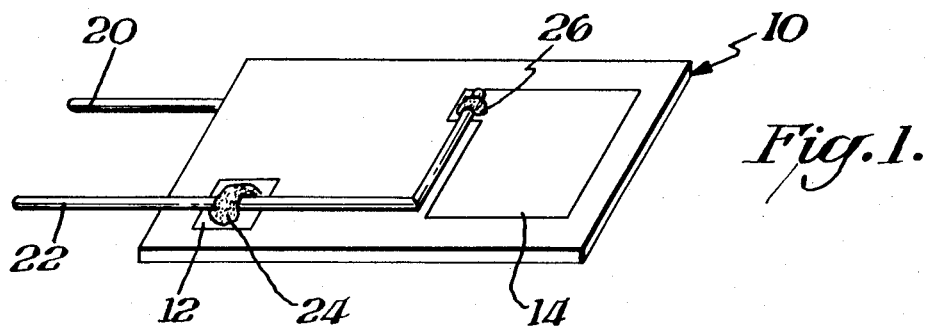
FIG. 1 shows a top view of a fusible ceramic capacitor formed in accordance with this invention.
Figure 2:
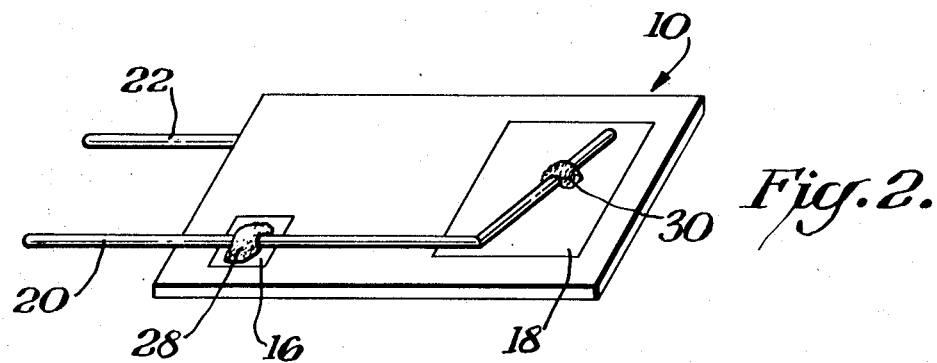
FIG. 2 shows a bottom view of the fusible ceramic capacitor of FIG. 1.

FIGS. 1 and 2 show the top and bottom respectively of a fusible capacitor mounted on a substantially flat insulating supporting body 10 having two generally parallel surfaces, which is in the form of a ceramic substrate. Electrodes 14 and 18 are disposed on major opposing surfaces of substrate 10 in capacitive relation to each other. Metallized land areas 12 and 16 are also disposed on opposing surfaces of substrate 10 and spaced apart from electrodes 14 and 18 respectively. The substrate 10 may be formed of any desired ceramic material such as alumina or barium titanate or alternatively of any ceramic dielectric glass and will have two parallel surfaces with a predetermined distance therebetween establishing the desired value of capacitance when the ceramic becomes the dielectric of a completed capacitor. A typical capacitor formed in accordance with this invention would have a value of 0.01 microfarads and a voltage breakdown of several thousand volts.

Figure 3:
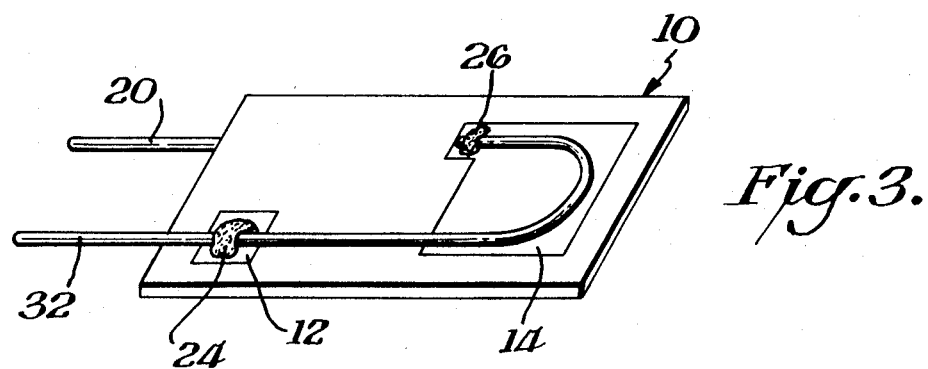
FIG. 3 shows a second alternate embodiment for a fusible ceramic capacitor.

In one preferred form of manufacturing the described component of FIGS. 1-3, silver plates or discs which may be nickel plated or gold immersion plated are applied to the two parallel faces of the substrate 10 to define the electrodes 14 and 18 and the metallized land areas 12 and 16. The electrodes and metallized land areas may be applied by such means as silk screening or offset printing and would be fired onto the substrate 10 by any of several well-known techniques.

Solderable lead 20 is fixedly attached to electrode 18 and metallized land area 16 at solder joints 30 and 28 respectively. Solder joints 28, 30 are formed of a high-temperature solder. One example of such a high melting point solder is an alloy composed of approximately 95 percent tin and 5 percent silver which would have a melting point typically in the range of 221°-245° C. although other high melting point solders could also be satisfactorily used. Lead 20 may be tinned copper or any other conductor that is readily solderable.

Lead 22 is connected to metallized land area 12 by means of a high melting point solder at solder joint 24 and to electrode 14 by means of a low melting point solder at solder joint 26. Again the high melting point solder may be an alloy composed of approximately 95 percent tin and 5 percent silver and having a melting point typically in the range of 221°-245° C. although other high melting point solders may also be satisfactorily used. The low melting point solder may include alloys composed of, bismuth, cadmium, tin and lead which have melting points ranging from 65°-111° C. depending upon the percentage of bismuth, cadmium, tin and lead used. Other low melting point solders may also be used, and the choice would depend upon the predetermined temperature at which it would be desirable to have the circuit open. Solders containing gallium may be used for extremely low melting point applications.

Lead wire 22 is made of a resilient springlike material and may consist of any of the following: spring phosphor bronze, spring brass, or spring steel. The spring wire lead 22 is initially soldered to metallized land area 12 at solder joint 24 in such a manner that the end of the wire lies above the tab of electrode 14. The wire end must then be pushed down to contact the tab and fastened to the tab with the low melting point solder at solder joint 26. Should there be a failure such as a dielectric short, the sudden surge of power will cause a heating of the solder joint so that the temperature of the solder joint 26 will rise to its melting point, whereupon the solder will flow, releasing the end of lead 22 which subsequently springs up and open circuits the capacitor.

FIG. 3 shows an alternate configuration for the spring wire lead. Lead 32 would be made of the same springlike material as lead 22 only instead of the right-angle bend of lead 22, there is an arcuately curved portion terminating at the low melting point solder joint 26. The fused ceramic capacitor of FIG. 3 operates in the same manner as the capacitor of FIGS. 1 and 2. Upon a sudden surge of power, possibly caused by dielectric failure or other external circuit failure, there would be a corresponding increase in temperature at solder joint 26 causing the low melting point solder to flow, thereby releasing the end of lead 32 which springs upwards and away from the surface of electrode 14, and open circuits the capacitor.

The capacitor component including electrodes 14 and 18, but not including the low melting point solder joint 26 or the spring leads 22, 32 may be encapsulated with a phenolformaldehyde resin such as that commercially known as "Durez." Alternatively, epoxy resins may also be used for encapsulating the capacitor element. Such an encapsulating housing will maintain the component free of contamination and degeneration from exposure to the atmosphere.

Figure 4:
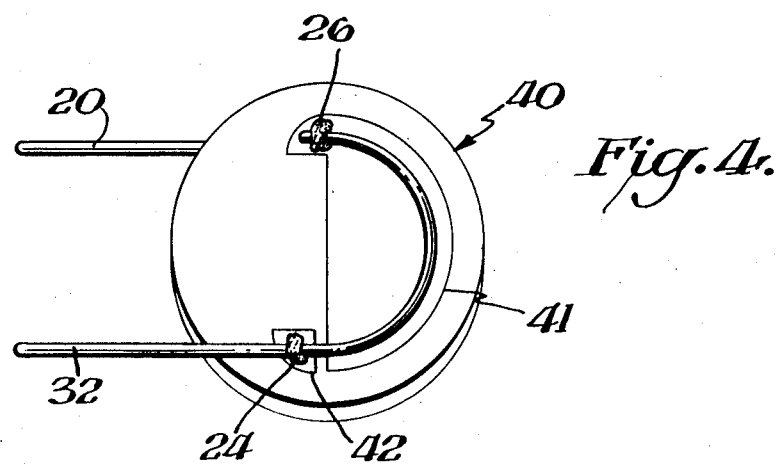
FIG. 4 shows a third alternate embodiment for a fusible ceramic capacitor.

Also the substrate need not be limited to the rectangular configuration as shown in the drawings and may also be of the disc configuration, as shown in FIG. 4, or of any other convenient size and shape. The capacitor of FIG. 4 includes disc-shaped dielectric substrate 40 upon which is disposed capacitor electrode 41. Metallized land area 42 is disposed on the surface of substrate 40 and in spaced-apart relation from electrode 41. Lead wires 20 and 32 are the same as previously described for FIGS. 1-3 with lead wire 32 connected at solder joint 24 by means of a high melting point solder and at solder joint 26 by means of a low melting point solder. The fused ceramic capacitor of FIG. 4 operates in the same manner as the capacitors of FIGS. 1 through 3. The springlike lead is also not limited to the two particular types of bends as described, but may be of any suitable configuration so long as the end soldered to the electrode with the low melting point solder, springs away from the capacitor upon melting of the solder.

An alternate lead structure for the capacitors of FIGS. 1 through 4 may include soldering the springlike lead to the capacitor electrode with a high melting point solder, in which case the other end of the springlike lead wire would terminate on the metallized land area. The springlike lead would be bent into contact with the metallized land area and retained thereto by means of a low melting point solder, so that upon any sudden surge of power, the lead would spring away from the metallized land area and open circuit the capacitor. A more conventional type of lead wire, such as tinned copper, could then be soldered to the metallized land area with a high melting point solder, so as to provide outside electrical contact to the capacitor. The springlike lead wire may be fixedly attached to either the capacitor electrode or the metallized land area, so long as the other end is bent down and retained by means of a low melting point solder, thereby forming an effectively fused capacitor.

What is claimed is:

1. A fusible ceramic capacitor comprising a ceramic substrate having two generally parallel opposed surfaces, a first electrode disposed on one of said surfaces, a second electrode disposed on the other of said surfaces in capacitive relation to said first electrode, a first means securing a resilient conductive lead wire to said substrate, a second means securing said lead wire to said first electrode, one of said first means and said second means including a low melting point solder, said lead wire and said first means and said second means being so constructed and arranged that heating of said solder above its melting point permits an end of said lead wire to spring away from its contact.

2. The capacitor of claim 1 wherein said first means includes a first metallized land area on said one surface and spaced from said first electrode.

3. The capacitor of claim 2 wherein one end of said resilient lead wire is urged into contact with said first metallized land area and retained in connection thereto by means of said low melting point solder; a high melting point solder bonding the other end of said resilient lead wire to said first electrode; and a second lead wire connected to said metallized land area by a high melting point solder.

4. The capacitor of claim 2 wherein one end of said resilient lead wire is urged into contact with said first electrode and retained in connection thereto by means of said low melting point solder; a high melting point solder bonding said resilient lead wire to said first metallized land area; and means for providing electrical contact to said first electrode includes extending the other end of said resilient lead wire beyond the edge of said substrate.

5. The capacitor of claim 2 wherein means for providing electrical contact to said second electrode includes a second lead wire soldered to said second electrode with a high melting point solder.

6. The capacitor of claim 5 wherein said second lead wire is fixedly attached to said substrate by means of a second metallized land area disposed on the same surface as said second electrode and spaced apart therefrom, with a high melting point solder bonding said second lead wire to said second metallized land area.

7. The capacitor of claim 1 wherein the low melting point solder is an alloy of bismuth, cadmium, lead and tin, and the high melting point solder is an alloy of tin and silver.

8. The capacitor of claim 1 wherein said resilient lead wire is selected from the group consisting of spring phosphor bronze, spring brass and spring steel.

9. The capacitor of claim 1 wherein substantially all of said first and second capacitor electrodes excepting that area immediately surrounding the point of contact of said resilient lead wire are encapsulated with a phenolformaldehyde resin.

10. The capacitor of claim 2 wherein said resilient lead wire contains a right-angle bend between said first metallized land area and said first electrode and wherein the end of said lead wire is soldered to a tab extending from said first electrode.

11. The capacitor of claim 2 wherein said resilient lead wire contains an arcuately curved portion between said first metallized land area and said first electrode and wherein the end of said lead wire is soldered to a tab extending from said first electrode.

* * * * *